United States Patent [19]
Fujisawa et al.

[11] Patent Number: 5,473,491
[45] Date of Patent: Dec. 5, 1995

[54] THIN FILM MAGNETIC HEAD HAVING AN IMPROVED MAGNETIC CORE

[75] Inventors: Wataru Fujisawa, Zushi; Syuuji Orihara, Yokosuka, both of Japan

[73] Assignee: Victor Company of Japan, Ltd., Yokohama, Japan

[21] Appl. No.: 236,623

[22] Filed: Apr. 29, 1994

[30] Foreign Application Priority Data

| Apr. 30, 1993 | [JP] | Japan | 5-127821 |
| Apr. 30, 1993 | [JP] | Japan | 5-127822 |
| May 10, 1993 | [JP] | Japan | 5-132578 |
| Nov. 30, 1993 | [JP] | Japan | 5-326039 |

[51] Int. Cl.$^6$ ............... G11B 5/147; G11B 5/23
[52] U.S. Cl. .................. 360/126; 360/119
[58] Field of Search ............ 360/119–122, 125, 360/126

[56] References Cited

U.S. PATENT DOCUMENTS

| 4,589,042 | 5/1986 | Anderson et al. | 360/125 |
| 4,839,197 | 6/1989 | Henderson | 427/116 |
| 5,089,334 | 2/1992 | Mallary et al. | 360/126 |
| 5,132,859 | 7/1992 | Andricacos et al. | 360/113 |
| 5,134,535 | 7/1992 | Mallary | 360/126 |
| 5,155,646 | 10/1992 | Fujisawa et al. | 360/126 |
| 5,285,340 | 2/1994 | Ju et al. | 360/126 |

Primary Examiner—Stuart S. Levy
Assistant Examiner—Jefferson Evans
Attorney, Agent, or Firm—Michael N. Meller

[57] ABSTRACT

The present invention discloses a thin film magnetic head having lower and upper cores, a rear intermediate core interposed between rear portions of the lower and upper cores, a pair of front intermediate cores interposed between front portions of the lower and upper cores and a magnetic gap interposed between the pair of the front intermediate cores, the thin film magnetic head. The rear portions of the lower and upper cores having wider cross-sectional area than those of the front portions of the lower and upper cores which are connected to the rear portions thereof forming an inflection point. In order to prevent the magnetic saturation of the front portions of the lower and upper cores, extended portions are respectively provided on the lower and upper cores by causing distal ends of the front intermediate cores to be extended beyond the inflection point. Further, a spacer of a non-magnetic material, having a longer thickness than that of the magnetic gap, is interposed between the extended portions to prevent the leakage flux between the extended portions.

2 Claims, 14 Drawing Sheets

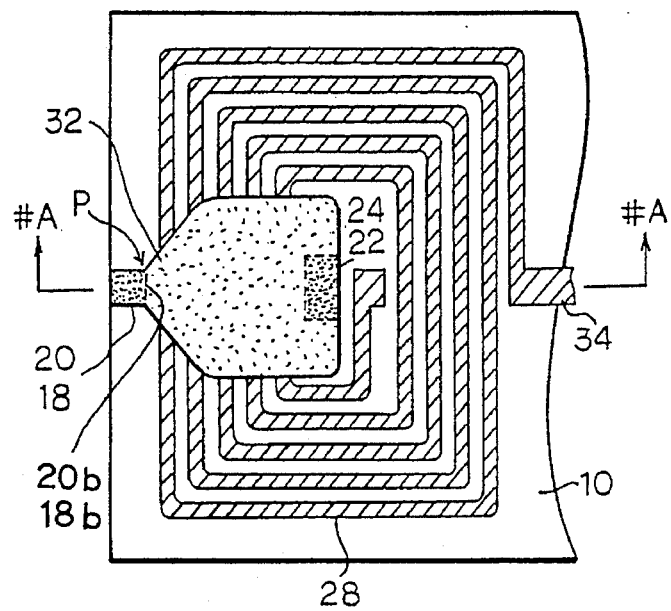
Fig.1 (A) PRIOR ART
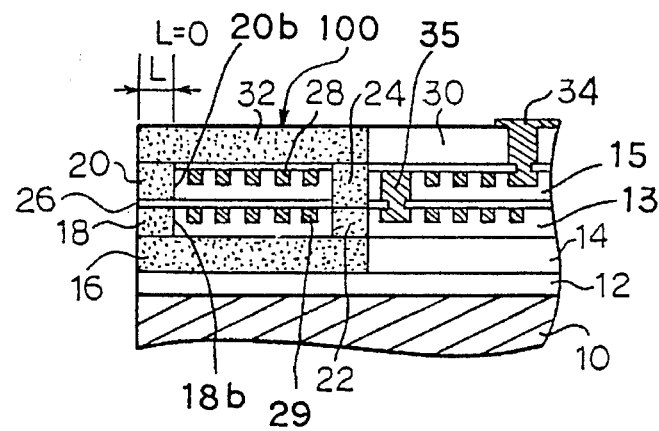
Fig.1 (B) PRIOR ART
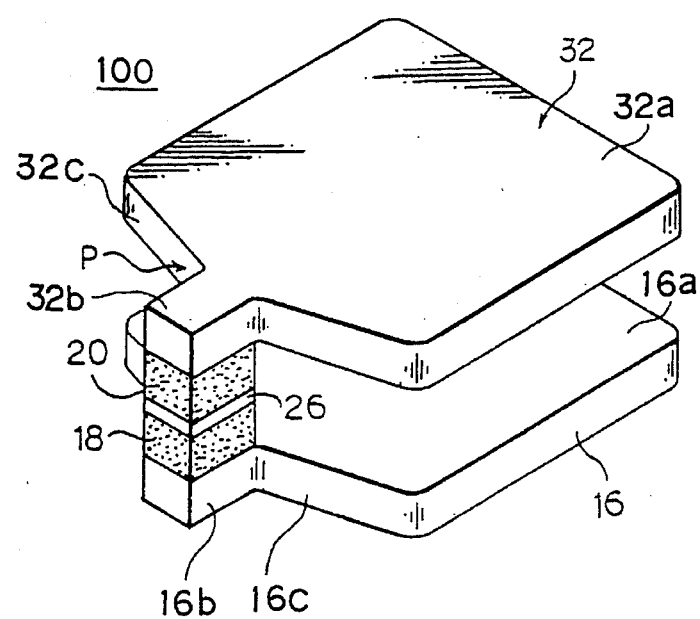
Fig.1 (C) PRIOR ART

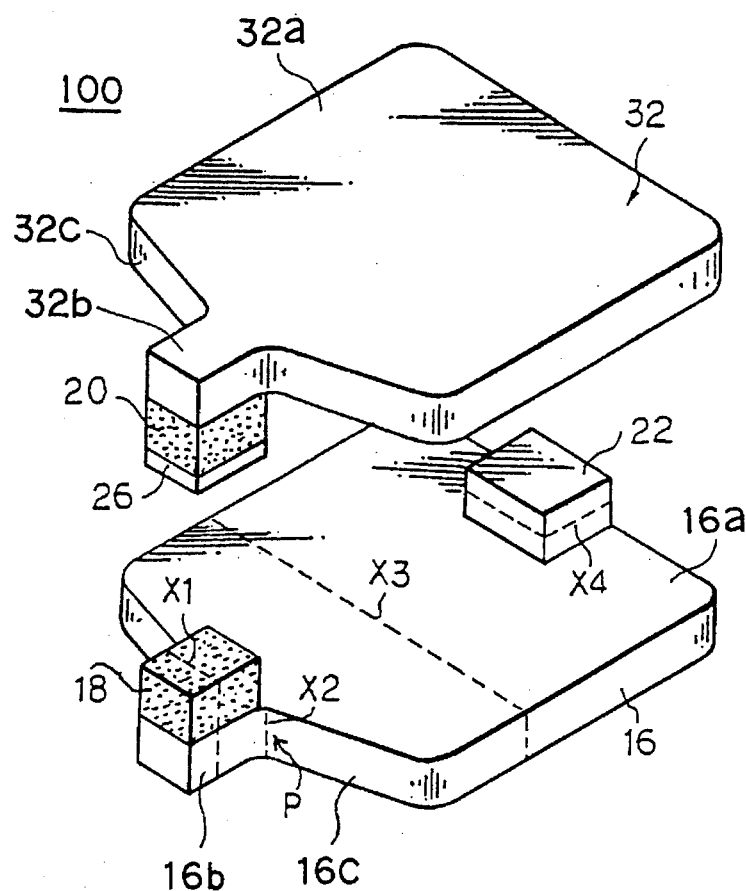
*Fig.2 (A)*
PRIOR ART
*Fig.2 (E)*
PRIOR ART
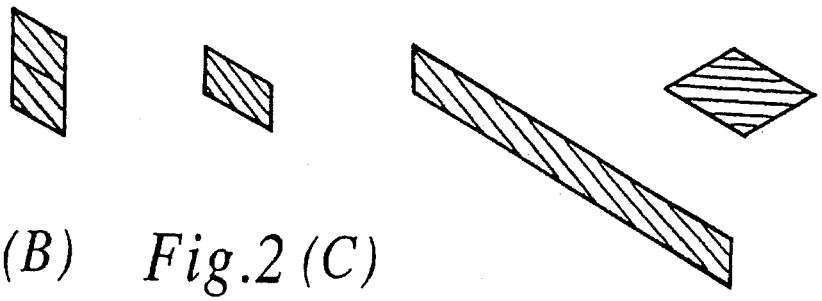
*Fig.2 (B)*
PRIOR ART
*Fig.2 (C)*
PRIOR ART
*Fig.2 (D)*
PRIOR ART

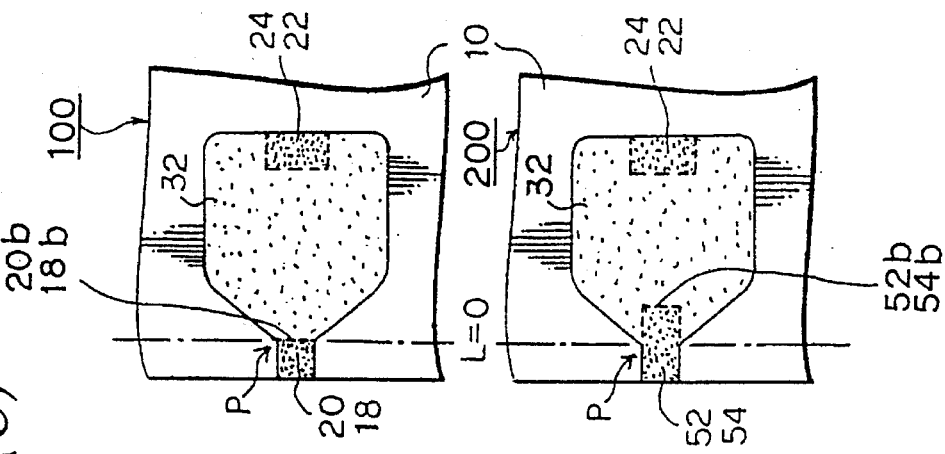
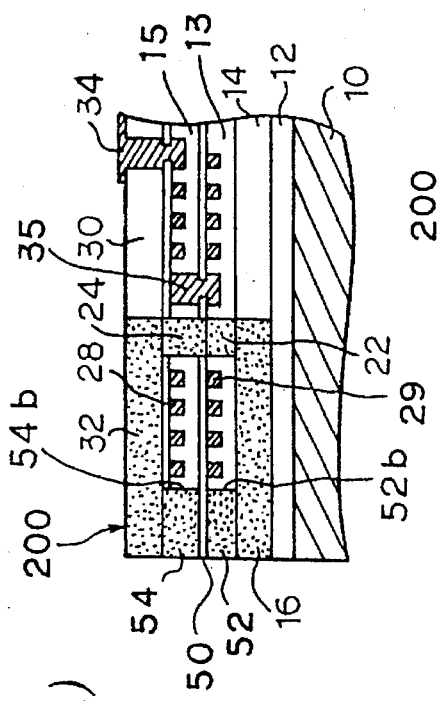
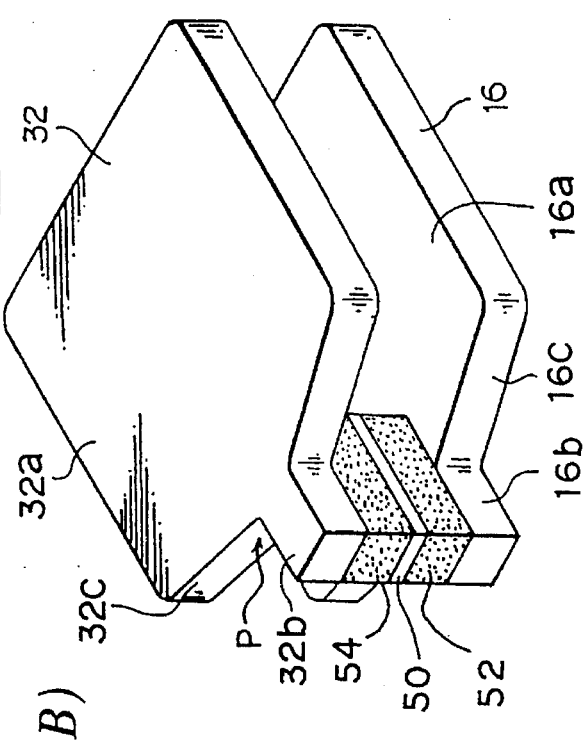
Fig. 4(A)
Fig. 4(B)
Fig. 4(C)

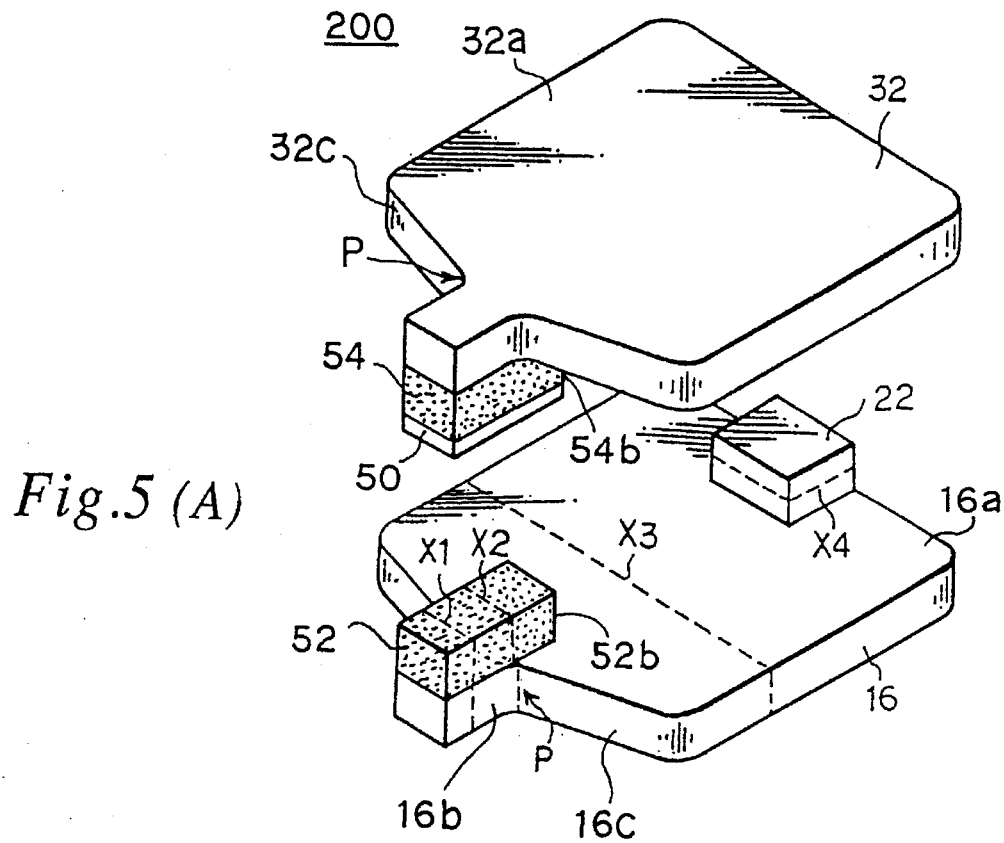
*Fig.5 (A)*
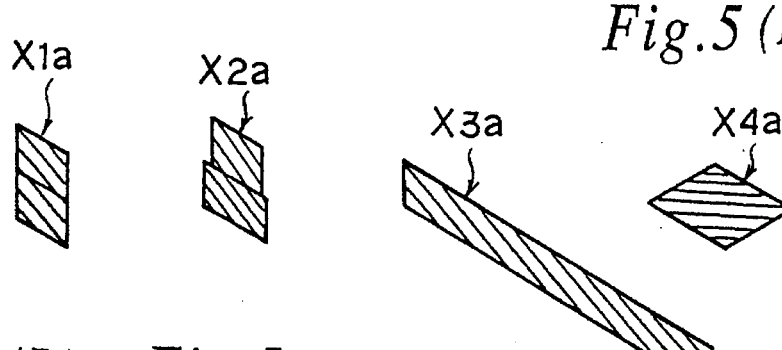
*Fig.5 (B)*  *Fig.5 (C)*  *Fig.5 (D)*  *Fig.5 (E)*

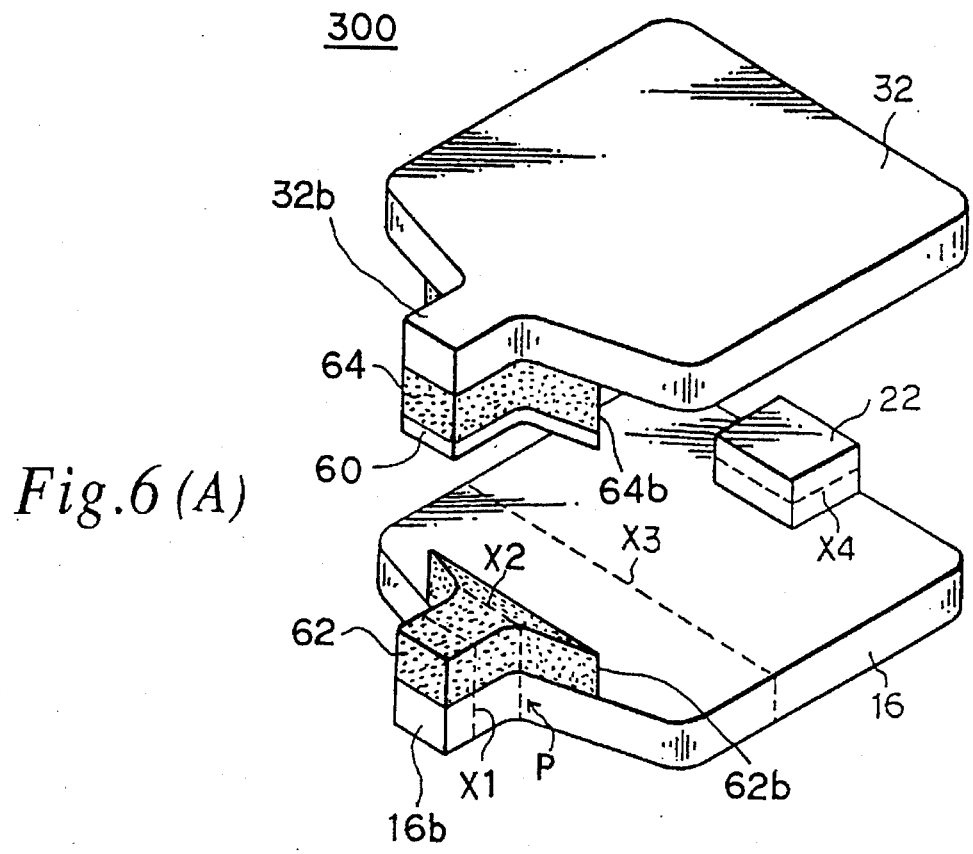
*Fig.6 (A)*
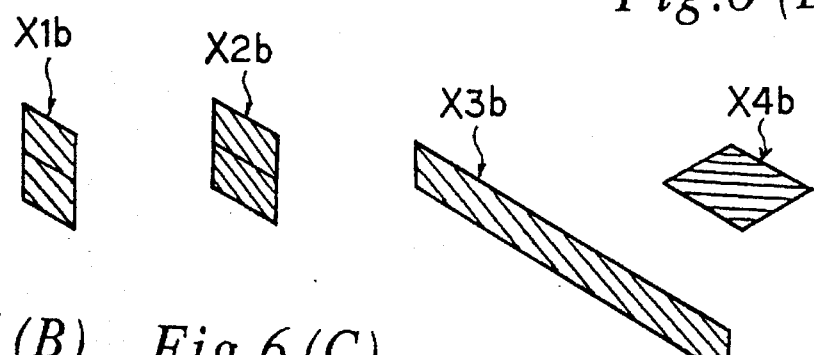
*Fig.6 (B)*  *Fig.6 (C)*  *Fig.6 (D)*  *Fig.6 (E)*

THIN FILM MAGNETIC HEAD HAVING AN IMPROVED MAGNETIC CORE

BACKGROUND OF THE INVENTION

1. Field of the Invention

The present invention relates to a thin film magnetic head, in particular, it relates to an improvement of a magnetic core configuration around a magnetic gap region for preventing magnetic saturation and reducing leakage flux.

2. Description of the Related Art

In the prior art, there is disclosed a thin film magnetic head in Japanese Patent Laid-open Publication 3- 58308/ 1991 by the present applicant, wherein a closed magnetic circuit of a magnetic head core is constructed by an upper core, a lower core and intermediate cores interposed between the upper and lower cores. Each of these cores is embedded in an insulation layer to be flush therewith. Thus, it is possible to obtain a magnetic circuit having excellent magnetic properties by forming each of the cores in a pattern exactly using a thin film forming technique such as a photo-lithograph. It is noted that a side of the thin film magnetic head confronting a magnetic recording medium is referred to as a front side for convenience, and an opposite side of the front side is referred to as a rear side. Further, a side of a substrate is referred to as a lower side, and an opposite side of the lower side is referred to as an upper side hereafter.

FIG. 1(A) is a plan view showing a thin film magnetic head of the prior art, 1(B) is a sectional view taken along line #A—#A of FIG. 1(A) and FIG. 1(C) is a perspective view showing a construction of a magnetic core portion of FIGS. 1(A) and 1(B).

Referring to FIGS. 1(A)—1(C), a reference character 10 designates a substrate, and 12 a first insulating layer provided on the substrate 10. On the first insulating layer 10, a lower core 16 is formed surrounded by a second insulating layer 14 to be flush therewith. On the lower core 16, front intermediate cores 18, 20 and a rear intermediate lower core 22 and a rear intermediate upper core 24 are respectively stacked. A magnetic gap 26 made of non-magnetic material is provided between the front intermediate cores 18, 20. Further, coils 28, 29 are respectively embedded in a third insulator 13 and a fourth insulator layer 14 by causing them to be wound around the rear intermediate lower core 22 and the rear intermediate upper core 24. One of the distal ends of coils 28 and that of another coil 29 are connected to a connecting portion 35. Other distal ends of coils 28, 29 are respectively connected to lead wires 34. In FIG. 1(B), a reference character 30 designates a fifth insulator layer, however, it is not depicted in FIG. 1(A).

Thus, it will be understood from the above description that a magnetic head core 100 forming a magnetic circuit of the prior art comprises the lower and upper cores 16, 32, the front intermediate cores 18, 20, the magnetic gap 26 interposed between the lower and upper cores 16, 32 and the rear intermediate lower and upper cores 22, 24.

As shown in FIGS. 1(A) and (C), the upper core 32 generally comprises a rear portion 32a (a right-hand side) having a rectangular shape, a front portion 32b (a left-hand side) having a narrower rectangular shape than that of the rear portion 32a and an intermediate portion 32c having a pair of slanting parts interposed between the rear and front portions 32a and 32b in the plan view. The front portion 32b of the upper core 32 has the same width as a track width W along which signals are recorded on the recording medium.

A reference character P designates an inflection point at which the intermediate portion 32c and the front portion 32b is connected. Thus, the width at the inflection point is the same as the track width W, because the inflection point P is in accordance with a root of the front portion 32b.

The lower core 16 has the same shape as that of the upper core 32, thus the detailed description of the lower core is omitted. The reference characters 16a, 16b and 16c respectively designate a rear portion, a front portion and an intermediate portion of the lower core 16.

Front intermediate cores 18, 20 are respectively provided on the front portions 16b, 32b in such a manner that rear distal ends of the front intermediate cores 18, 20 accord with the inflection points P. Further, in the plan view, areas of the front portions 16b, 32b are made substantially equal to attached areas of the front intermediate cores 18, 20.

As shown in FIG. 1(B), an overall thickness of the magnetic head core 100 within a range of a gap depth L defined from a contact surface of the recording medium to the inflection point P, is equal to the total sum of thicknesses of the lower and upper cores 16, 32 and of the front intermediate cores 18, 20.

Next, the description is given of the magnetic circuit of the magnetic head core 100.

FIG. 2(A) is an exploded perspective view showing a construction of a magnetic head core portion by separating an upper core from a lower core, FIG. 2(B) is a perspective view showing a cross-sectional area taking along a line X1, FIG. 2(C) is a perspective view showing a cross-sectional area taking along a line X2, FIG. 2(D) is a perspective view showing a cross-sectional area taking along a line X3, and FIG. 2(E) is a perspective view showing a cross-sectional area taking along a line X4.

As seen from FIGS. 2(B)–2(E), each of the cross-sectional areas defined by lines X1–X4 shows a cross-sectional area of the magnetic circuit of the magnetic head core 100. Comparing these cross-sectional areas of the magnetic circuit with one another, the cross-sectional area along the line X2 nearby the inflection point P is relatively the narrowest among these areas, thus it will be understood that the cross-sectional area along the line X2 is most easily magnetically saturated, which poses a degradation of a magnetic efficiency of the thin film magnetic head.

Next, a description is given to a magnetic leakage flux of the thin film magnetic head.

Referring to FIG. 3, generally, as well known, a magnetic flux 8 generated from an N pole of a magnetization segment in a recording medium 7 penetrates into a front intermediate core 3, then passes through an upper core 5, a rear intermediate core 4 and a lower core 2 and returns to an S pole of the magnetization segment, thus a magnetic closed circuit is obtained. An output voltage from the thin film magnetic head is obtained in proportion to the magnetic flux change per unit time which passes through a coil 9 and an amount of the magnetic flux 8 passing through the magnetic closed circuit.

When a magnetic material having a low relative permeability is employed as the magnetic head cores forming a magnetic circuit, and the upper core 5 and the lower core 2 are disposed facing closely to each other, a part of the magnetic flux 8 passes through a space between the upper and lower cores 5, 2 as a leakage flux 8a to make a short magnetic closed circuit, which poses a decrease of the output voltage of the thin film magnetic head.

SUMMARY OF THE INVENTION

Accordingly, a general object of the present invention is to provide a novel and useful thin film magnetic head in which the above disadvantage has been eliminated.

A more specific object of the present invention is to provide a thin film magnetic head having an excellent recording and reproducing efficiency.

Another specific object of the present invention is to provide a thin film magnetic head having an excellent recording and reproducing efficiency by causing magnetic saturation in the magnetic cope and leakage flux between an upper core and a lower cope to decrease.

Another specific object of the present invention is to provide a thin film magnetic head comprising lower and upper cores, a rear intermediate core interposed between Pear portions of the lower and upper cores, a pair of front intermediate cores interposed between front portions of the lower and upper cores and a magnetic gap provided between the pair of the front intermediate copes, the thin film magnetic head comprising, the rear portions of the lower and upper cores having wider cross-sectional areas than those of the front portions of the lower and upper cores connected to the reap portions thereof forming an inflection point, and an extended portion provided at least on one of the front portions of the lower and upper cores by causing a distal end of the one of the front intermediate cores to be extended over the inflection point.

Another specific object of the present invention is to provide a thin film magnetic head comprising lower and upper cores, a rear intermediate core interposed between rear portions of the lower and upper cores, a pair of front intermediate cores interposed between front portions of the lower and upper cores and a magnetic gap provided between the pair of the front intermediate cores, the thin film magnetic head comprising, the rear portions of the lower and upper cores having wider cross-sectional area than those of the front portions of the lower and upper cores connected to the rear portions thereof forming an inflection point, extended portions respectively provided on the lower and upper cores by causing distal ends of the front intermediate cores to be extended beyond the inflection point, and a spacer of a non-magnetic material interposed between the extended portions, the spacer having a larger thickness than that of the magnetic gap.

Another specific object of the present invention is to provide a thin film magnetic head comprising a substrate, a lower core provided on the substrate, an upper core provided above the lower core, a rear intermediate core interposed between rear portions of the lower and upper cores, a pair of front intermediate cores interposed between front portions of the lower and upper cores and a magnetic gap provided between the front intermediate cores, the thin film magnetic head comprising, the lower and upper cores being disposed in such a manner that parts of the lower and upper cores form a superimposed portion and other parts of the lower and upper cores except for the superimposed portion are extended in an opposite direction so as not to face each other in a front view, a width of the superimposed portion being made smaller than the widths of the other parts of the lower and upper cores.

BRIEF DESCRIPTION OF THE DRAWINGS

FIG. 1(A) is a plan view showing a thin film magnetic head of the prior art,

FIG. 1(B) is a sectional view taken along line #A—#A of FIG. 1(A).

FIG. 1(C) is a perspective view showing a construction of a magnetic core portion of FIGS. 1(A) and 1(B).

FIG. 2(A) is an exploded perspective view showing a construction of a magnetic head core portion in FIG. 1(C) by separating an upper core from a lower core.

FIG. 2(B) is a perspective view showing a cross-sectional area taking along a line X1 in FIG. 2(A).

FIG. 2(C) is a perspective view showing a cross-sectional area taking along a line X2 in FIG. 2(A).

FIG. 2(D) is a perspective view showing a cross-sectional area taking along a line X3 in FIG. 2(A).

FIG. 2(E) is a perspective view showing a cross-sectional area taking along a fine X4 in FIG. 2(A).

FIG. 4(A) is a cross-sectional view showing a main part of a thin film magnetic head of the first embodiment according to the present invention.

FIG. 4(B) is a perspective view showing a construction of a magnetic core portion of the thin film magnetic head shown in FIG. 4(A).

FIG. 4(C) is a plan view showing a thin film magnetic head of the first embodiment together with a magnetic head of the prior art for comparison.

FIG. 5 (A) is an exploded perspective view showing the lower core and the upper core of the first embodiment in FIG. 4(B) in a separated state.

FIG. 5(B) is a perspective view showing a cross-sectional area along a line X1 in FIG. 5(A).

FIG. 5(C) is a perspective view showing cross-sectional area along a line X2 in FIG. 5(A).

FIG. 5(D) is a perspective view showing a cross-sectional area along a line X3 in FIG. 5(A).

FIG. 5(E) is a perspective view showing a cross-sectional area along a line X4 in FIG. 5(A).

FIG. 6(A) is an exploded perspective view showing the lower core and a upper core of the second embodiment in a separated state.

FIG. 6(B) is a perspective view showing a cross-sectional area along a line X1 in FIG. 6(A).

FIG. 6(C) is a perspective view showing a cross-sectional area along a line X2 in FIG. 6(A).

FIG. 6(D) is a perspective view showing a cross-sectional area along a line X3 in FIG. 6(A).

FIG. 6(E) is a perspective view showing a cross-sectional area along a line X4 in FIG. 6(A).

DETAILED DESCRIPTION OF THE PREFERRED EMBODIMENTS

Figure 3:
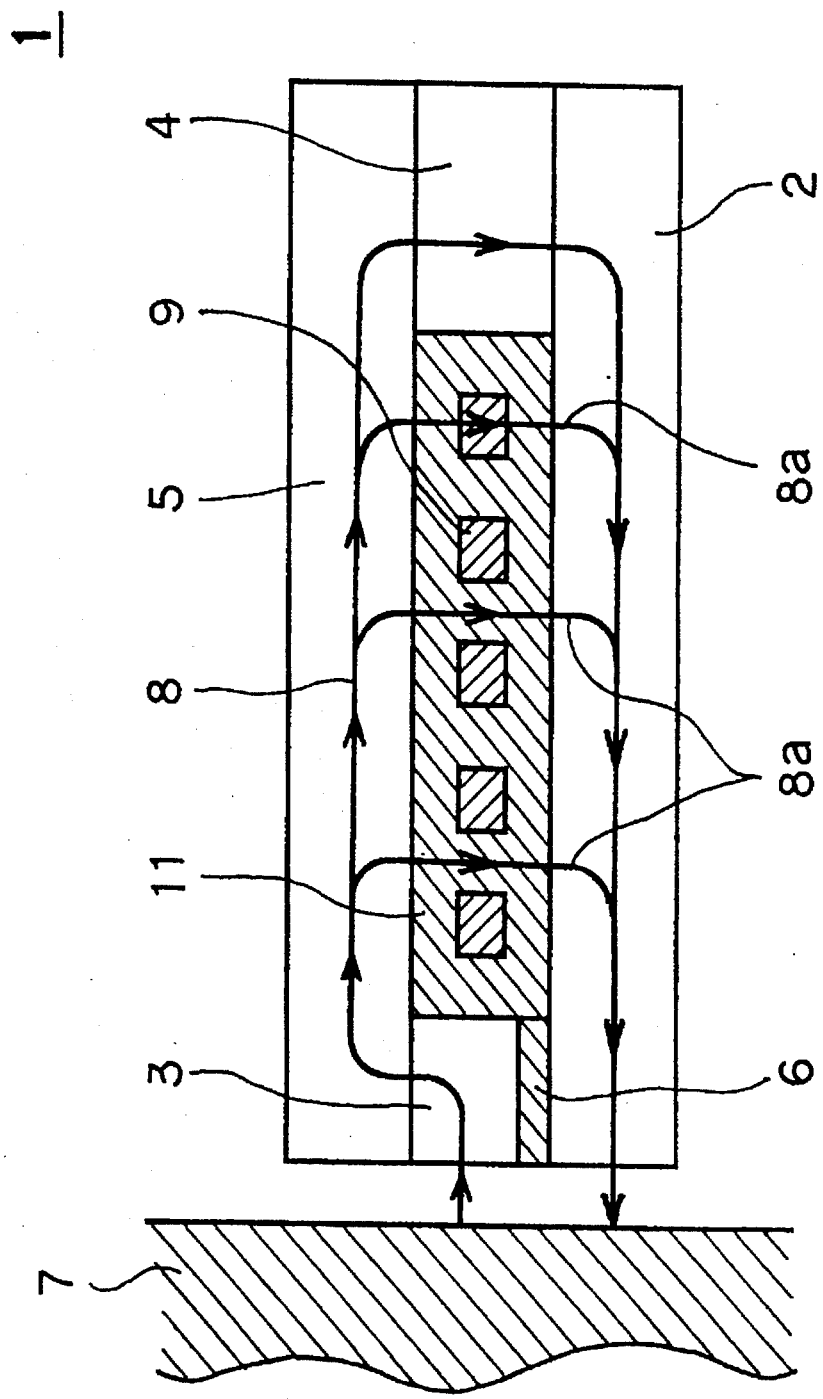
FIG. 3 is a sectional view for explaining a general concept of a leakage flux in the thin film magnetic head.

Generally, according to the present invention, the front intermediate cores are respectively provided on the front portions each having a small rectangular shape located at a front side of the upper or the lower core by causing the intermediate cores to be extended backward over the inflection points, whereby the cross-sectional areas of the magnetic circuit nearby the inflection points are increased, thus the magnetic saturation of the magnetic circuit is improved.

A first embodiment of a thin film magnetic head

FIG. 4(A) is a cross-sectional view showing a main part of a thin film magnetic head of a first embodiment according to the present invention, FIG. 4(B) is a perspective view showing a construction of a magnetic core portion of the thin film magnetic head shown in FIG. 4(A), and FIG. 4(C) is a plan view showing a thin film magnetic head of the first embodiment together with a magnetic head of the prior art for comparison, wherein the same components as those described in the prior art are designated with common reference characters, and their detailed descriptions are omitted for convenience.

In this embodiment, the lower core 16 and the upper core 32 are made to have the same configuration as those of the prior art shown in FIG. 2(A).

Referring to FIGS. 4(A)–4(C), a feature of a magnetic head core 200 of this embodiment is that the front intermediate cores 52, 54, each having a rectangular shape, are respectively provided on the front portions 16b, 32b of the lower and upper cores 16, 32 in such a manner that rear ends of the front intermediate cores 52, 54 are more extended backward over the inflection points P compared with the intermediate cores 18, 20 of the prior art shown in FIG. 1(C). The constructions other than this feature are the same as those of the prior art, thus, the detailed description is omitted here.

FIG. 5 (A) is a perspective view showing the lower core and the upper core of the first embodiment in a separated state, FIG. 5(B) is a perspective view showing a cross-sectional area along a line X1 (loop) in FIG. 5(A), FIG. 5(C) is a perspective view showing a cross-sectional area along a line X2 (loop) in FIG. 5(A), FIG. 5(D) is a perspective view showing a cross-sectional area along a line X3 (loop) in FIG. 5(A) and FIG. 5(E) is a perspective view showing a cross-sectional area along a line X4 (loop) in FIG. 5(A).

Referring to FIGS. 5(A)–5(E), a description is given to main cross-sectional areas of the magnetic head core 200 of the first embodiment.

Each of cross-sectional areas X1a, X3a, X4a of the magnetic head core 200, each defined by a broken line X1 shown in FIG. 5(B), a broken line X3, shown in FIG. 5(D) and a broken line X4, shown in FIG. 5(E), is identical to that of the prior art shown in FIG. 1. However, a cross-sectional area X2a defined by a broken line X2, shown in FIG. 5(C) is increased by a cross-sectional area of the intermediate core 52 compared with that of the prior art shown FIG. 1. Thus, the magnetic saturation nearby the inflection point P is improved because of the increase of the cross-sectional area thereof.

A second embodiment of a thin film magnetic head

Figure 7:
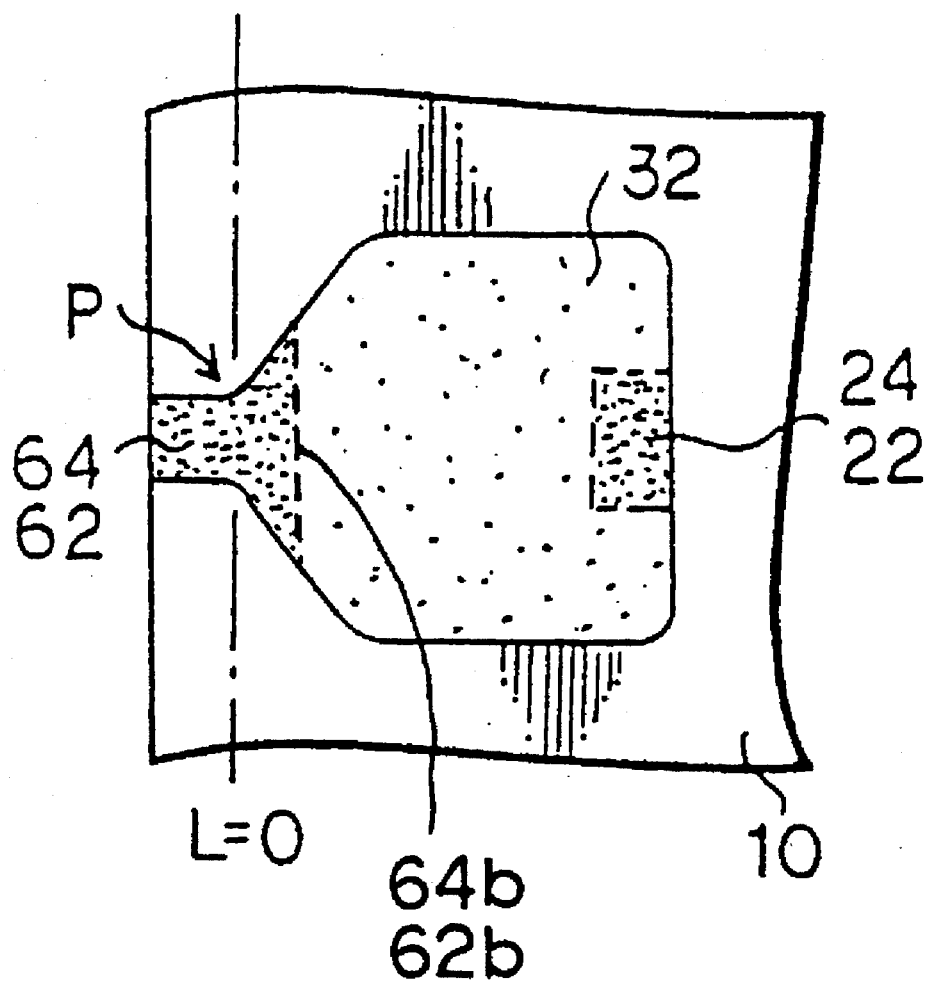
FIG. 7 is a plan view showing an upper core of the second embodiment.

FIG. 6 (A) is a perspective view showing the lower core and the upper core of a second embodiment in a separated state, FIG. 6(B) is a perspective view showing a cross-sectional area along a line X1 in FIG. 6(A), FIG. 6(C) is a perspective view showing a cross-sectional area along a line X2 in FIG. 6(A), FIG. 6(D) is a perspective view showing a cross-sectional area along a line X3 in FIG. 6(A), FIG. 6(E) is a perspective view showing a cross-sectional area along a line X4 in FIG. 6(A) and FIG. 7 is a plan view showing an upper core of a second embodiment.

Referring to FIGS. 6(A)–6(E) and FIG. 7, a description is given of a second embodiment of a magnetic head core 300 of the present invention.

A feature of the magnetic head core 300 is that front intermediate cores 62, 64 of this embodiment are respectively provided on the front portions 16b, 32b of the lower and upper cores 16, 32 in such a manner that rear ends 62b, 64b of the front intermediate cores 62, 64 are extended backward over the inflection point P by causing the extended portions 62b, 64b of the front intermediate core 62, 64 to be placed along both slanted parts of the lower core 16 and the upper core 32, i.e., each of the extended portions 62b, 64b of the front intermediate cores 62, 64 has a tapered shape along the slant portion of the lower core 16 or the upper core 32.

Next, a description is given to the main cross-sectional areas of the magnetic head core 300 referring to FIGS. 6(A)–6(E).

Each of the cross-sectional areas X1b, X3b, X4b of the magnetic head core 300, each defined by a broken line X1, shown in FIG. 6(B), a broken line X3, shown in FIG. 6(D) or a broken line X4, shown in FIG. 6(E), is the same as that of the prior art shown in FIG. 1. However, the cross-sectional area X2b, defined by a broken line X2, shown in FIG. 6(C) is increased by a cross-sectional area of the front intermediate core 62 compared with that of core 52 of the first embodiment shown FIG. 5(C). Thus, the magnetic saturation nearby the inflection point P is further improved because of the increase of the cross-sectional area thereof.

The constructions other than this feature in the embodiment are the same as those of the first embodiment shown in FIG. 5(A), thus, the detailed description is omitted here.

Figure 8A:
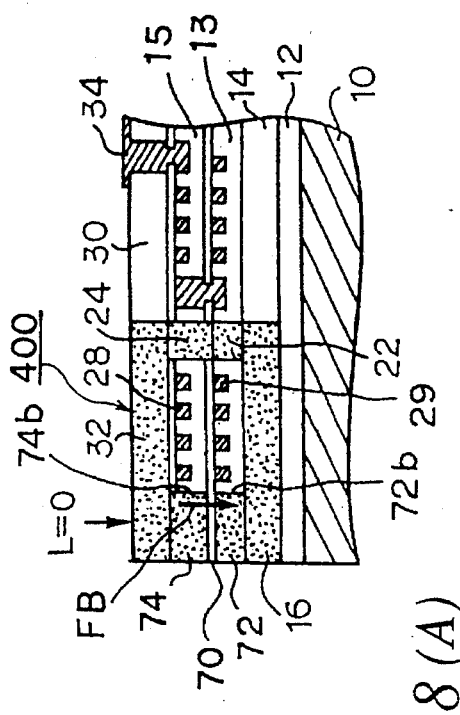
FIG. 8 (A) is a cross-sectional side view showing a magnetic core portion including coils of a third embodiment of the present invention.
FIG. 8(B) is an exploded view of a magnetic core portion of the third embodiment of the present invention.
FIG. 8(C) is a plan view showing the third embodiment of a thin film magnetic head.
Figure 8C:
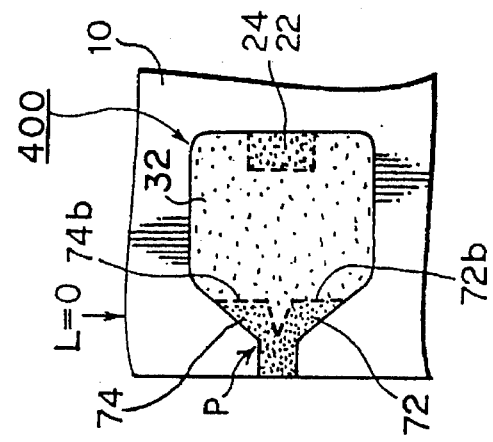
Figure 8B:
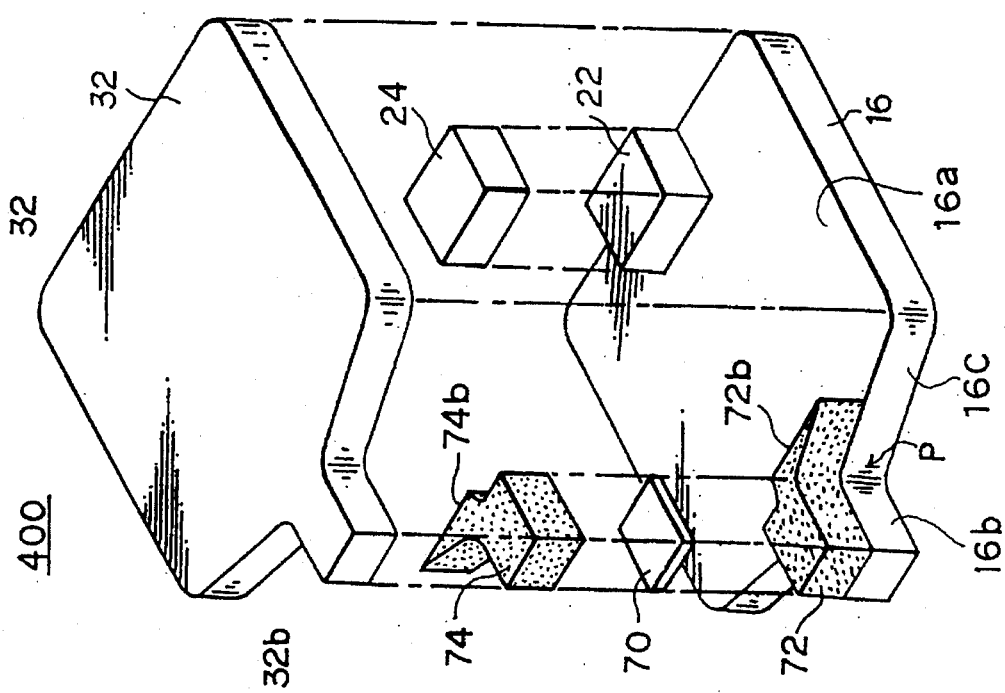

A third embodiment of a thin film magnetic head FIG. 8 (A) is a cross-sectional side view showing a magnetic core portion including coils of the third embodiment of the present invention, FIG. 8(B) is an exploded view of the magnetic core portion of a third embodiment of the present invention, and FIG. 8(C) is a plan view showing the third embodiment of a thin film magnetic head.

Referring to FIGS. 8(A)–8(C), a feature of a magnetic head core 400 of a third embodiment according to the present invention is that front intermediate cores 72, 74 are respectively provided on the front portions 16b, 32b of the lower and upper cores 16, 32 in such a manner that rear ends 72b, 74b of the front intermediate cores 72, 74 are respectively extended backward over the inflection point P by causing the rear end 72b to be extended along a right-hand slant end of the lower core 16 and the rear end 74b to be extended along a left-hand slant end of the upper cores 32 so that the extended portions 72b, 74b do not oppose each other. Thus, the cross-sectional areas at the inflection point P in the magnetic head core 400 are increased regarding both the lower and upper cores 16, 32.

Generally, upon recording signals on a recording medium with a magnetic head, it is preferable for the magnetic head to generate an intensive magnetic filed strength toward the recording medium from a magnetic gap of the magnetic head. However, when the front intermediate cores between which the magnetic gap is interposed, are extended backward as shown in the examples of the first and second embodiment of the present invention, the intensive magnetic field strength can not be obtained from the magnetic gap because the magnetic flux generated by a coil wound around a magnetic core easily passes through the magnetic gap because the front intermediate cores are facing each other with a wide cross-sectional area, so that the leakage flux from the magnetic gap toward the recording medium is decreased.

In this embodiment, the above disadvantage is eliminated by causing the rear ends 72b, 74b of the front intermediate cores 72, 74 to be respectively extended backward in an opposite direction along the slant ends of the lower and upper cores 16, 32 so that the extended portions of the intermediate cores 72, 74 are not opposite each other. Thus, the thin film magnetic head of this embodiment enables a thin film magnetic head to be provided having an excellent recording and reproducing efficiency with less magnetic saturation.

The constructions other than this feature in this embodiment are the same as those of the second embodiment shown in FIG. 6(A), thus, the detailed description is omitted here. A fourth embodiment of the thin film magnetic head FIG. 9 (A) is a sectional side view showing a main part of a magnetic core portion of the fourth embodiment of the present invention, FIG. 9(B) is a plan view showing a main part of a magnetic core portion of the fourth embodiment, and FIG. 9(C) is a sectional side view showing an modification that may be incorporated in FIG. 9(A) and FIG. 9(B).

Figure 9A:
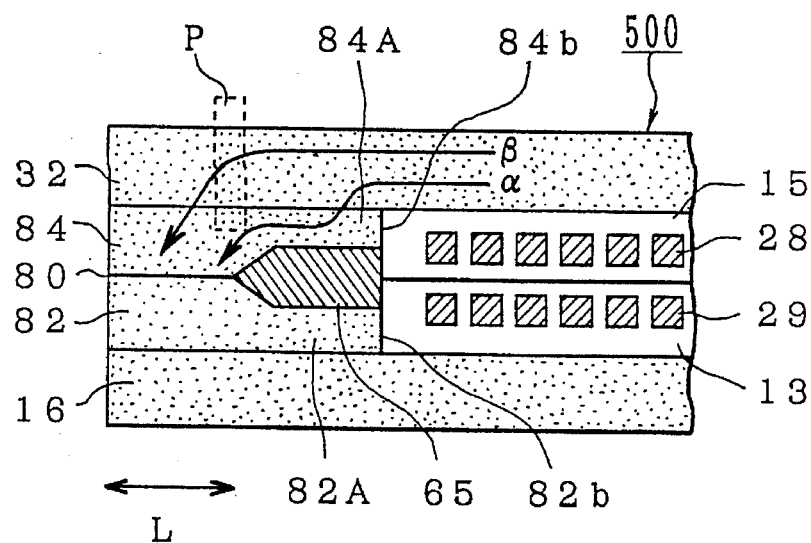
FIG. 9 (A) is a sectional side view showing a main part of a magnetic core portion of a fourth embodiment according to the present invention.
FIG. 9(B) is a plan view showing a main part of a magnetic core portion of the fourth embodiment.
FIG. 9(C) is a sectional side view showing a modification that may be incorporated in FIG. 9(A) and FIG. 9(B).
Figure 9B:
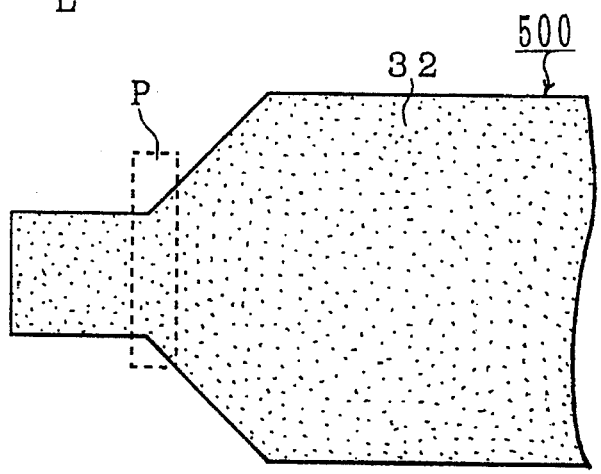

Referring to FIG. 9(A) and FIG. 9(B), features of a magnetic head core 500 in this embodiment are that front intermediate cores 82, 84 between which the magnetic gap 80 is provided, are respectively provided on the lower and upper cores 16, 32 by causing the rear ends 82b, 84b of the front intermediate cores 82, 84 to be extended backward over the inflection points P, at which a gap depth L is equal to 0, and a spacer 65 made of a non-magnetic material having a larger thickness than a gap length is interposed between extended portions 82A, 84A of the front intermediate cores 82, 84. The lengths of the extended portions 82A, 84A are determined so as to satisfy a condition as mentioned hereafter.

Figure 9C:
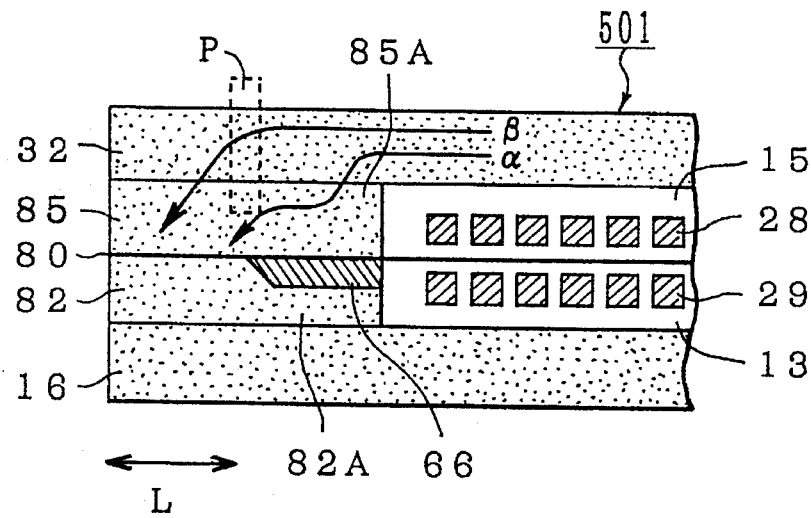

Referring to FIG. 9(C), in another magnetic head core 501 of this embodiment, a spacer 66 may be provided only in one of the front intermediate cores 82, 85, which enables the production process to be simple without degrading the characteristic of the thin film magnetic head.

The constructions other than these features are the same as those of the second embodiment shown in FIG. 6(A), thus, the detailed description is omitted here.

Next, a description is given of an operation of the thin film magnetic head of the fourth embodiment referring to FIGS. 9(A)-9(C).

The magnetic flux generated by the coils 28, 29 passes through the magnetic head core 500 comprising the upper and lower cores 16, 32 and the front and rear intermediate cores 82, 84 and 22, 24 (not shown). A part of the magnetic flux shown with an arrow α passes through the extended portion 84A of the front intermediate core 84 from the upper core 32 in advance in time wise of the other part of the magnetic flux shown with an arrow β, and passes through the front portion of the front intermediate core 84 and the magnetic gap 80 in this order. The other part of the magnetic flux β passes through the upper core 32, the front portion of the front intermediate core 84 and the magnetic gap 80 in this order.

Thus, the cross-sectional areas nearby the inflection point P in the magnetic head core 500 are increased, so that the magnetic saturation can be improved as well as those of the first to third embodiments mentioned in the foregoing, specifically, by a cross-sectional area obtained by reducing a thickness of spacer 65 from an overall thickness of the front intermediate cores 82, 84, through which more magnetic flux can pass.

Further, in this embodiment, the spacer 65 (or 66) is interposed between the extended portions 82A, 84A (82A, 85A) of the front intermediate cores 82, 84 (82, 85), which prevents the leakage flux from occurring therebetween, thus, the recording and reproducing efficiency is improved.

Generally, a maximum recording ability of a magnetic head depends on a maximum amount of the magnetic flux passing through the magnetic gap, and the maximum amount of the magnetic flux is determined by cross-sectional areas of the front intermediate cores nearby the magnetic gap and a saturation magnetic flux density Bs of the magnetic head core.

Specifically, a maximum amount of the magnetic flux passing through a gap is obtained by a formula (1) as follows:

$$TrxLxBs \quad (1)$$

wherein Tr: a track width, L: a gap depth.

On the other hand, a maximum amount of the magnetic flux passing through a cross-sectional area of the core nearby the inflection point P in the magnetic circuit is obtained by a formula (2) as follows:

$$TrxtxBs \quad (2)$$

wherein "t" designates the thickness of the core nearby the inflection point P.

A condition that the core nearby the inflection point P is not saturated, is to satisfy TrxtxBs>TrxLxBs, thus t>L is obtained.

Next, a description is given to a specific example of the fourth embodiment.

For example, when assuming each of the thicknesses of the lower and upper cores 16, 32 and the front intermediate cores to be 5 μm, a thickness of the magnetic gap 80 to be 0.2 μm and a thickness of the spacer 65 to be 2 μm, the magnetic flux passing through the magnetic gap is increased compared with that of the prior art as described below.

The thickness t1 of the core nearby the inflection of the fourth embodiment is:

$$t1 = \text{the thickness of the upper core 32 + the}$$
$$\text{thickness of the extended portion 84A}$$
$$\text{of the front intermediate core 84}$$
$$= 5 \mu m + (5-2) \mu m$$
$$= 8 \mu m$$

On the other hand, in the prior art shown in FIGS. 2(A) and 2(C), the thickness t2 of the core nearby the inflection point P of the prior art is 5 μm.

The magnetic fluxes passing through the core nearby the inflection point P is proportional to the cross-sectional areas thereof. Thus a ratio of the magnetic flux passing through the core nearby the inflection point P of the fourth embodiment to that of the prior art is obtained as follows:

$$t1/t2 = 8/5 = 1.6 \qquad (3)$$

As seen from the above, the core nearby the inflection point P of the fourth embodiment enables the magnetic flux to pass by 1.6 times compared with that of the prior art.

Thus, according to this embodiment, when the gap depth length L is made within 8 μm taking account of the formulas (1) and (2), the magnetic saturation is prevented from occurring in the magnetic core 500 at the core nearby the inflection point P, which enables a thin film magnetic head to be provided having an excellent recording characteristic. Further the thickness of the spacer 65 is made 10 times the thickness of the magnetic gap 80. Thus, the leakage magnetic flux between the extended portions 82A and 84A of the front intermediate cores 82, 84, is decreased by 1/10 compared with a case where the spacer 65 is not provided.

According to the thin film magnetic head of the fourth embodiment, it is possible to provide a thin film magnetic head having an excellent recording and reproducing efficiency without causing a magnetic saturation even when long extended portions 82A, 84A of the front intermediate cores 82, 84 are provided on the lower and upper cores 16, 32.

Next, a description is given to how to determine a most suitable length, for instance, of the extended portion 84A of the front intermediate core 84.

Figure 10:
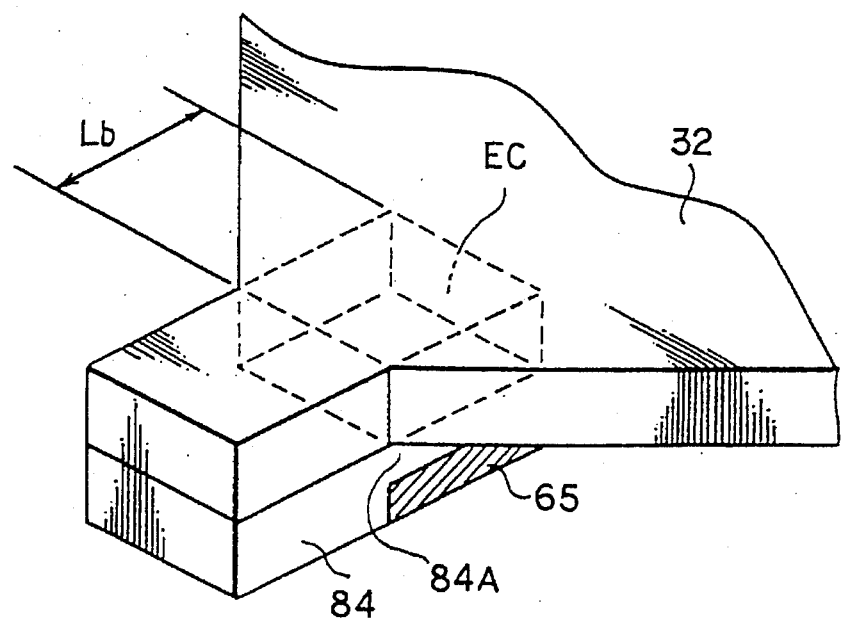
FIG. 10 is an enlarged perspective view showing the front intermediate core and an upper core of the fourth embodi
Figure 11:
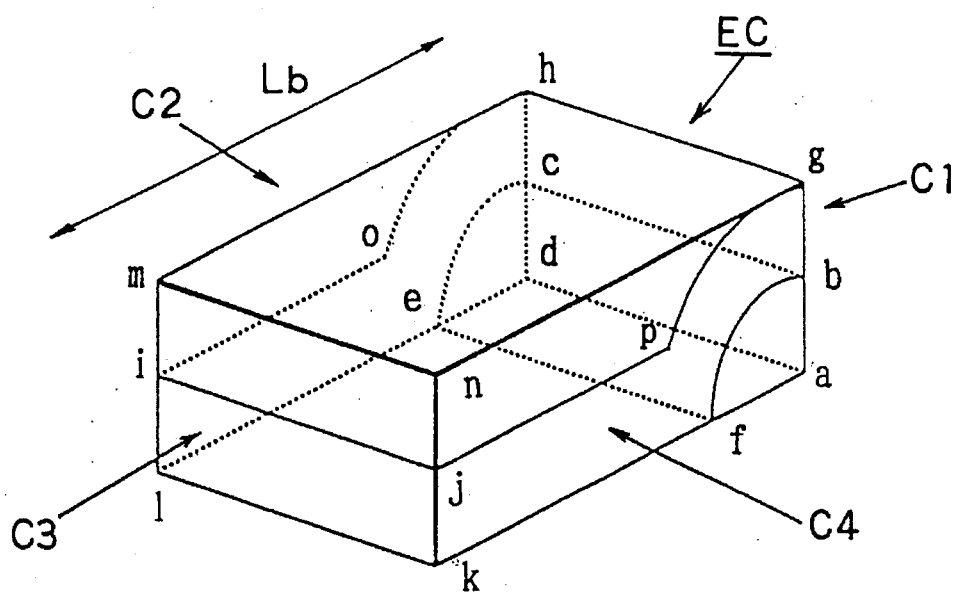
- FIG. 11 is an enlarged perspective view showing an EC domain shown in FIG. 10.
Figure 12:
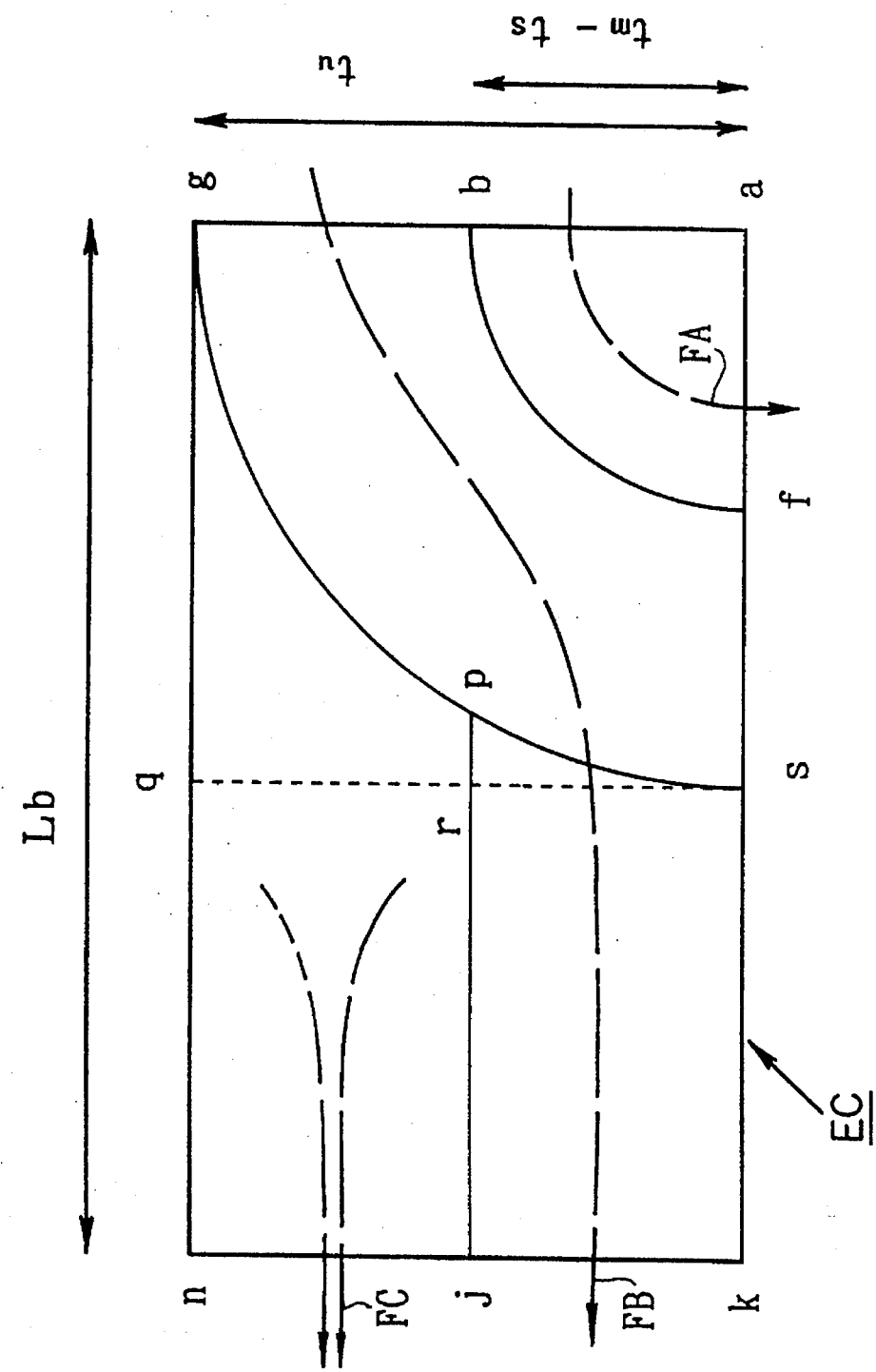
FIG. 12 is an explanatory view of the EC domain from a cross-sectional plane C1 shown in FIG. 11.

FIG. 10 is an enlarged perspective view showing the front intermediate core and and an upper core, FIG. 11 is an enlarged perspective view showing an EC domain shown in FIG. 10, and FIG. 12 is an explanatory view of the EC domain from a cross-sectional plane C1 shown in FIG. 11.

Referring to FIG. 10, a shape of distal end of the spacer 65 coinciding with a distal end of the gap depth L is made vertical to clarify an explanation of the most suitable length of the extended portion 84A.

Further, a domain EC of a rectangular prism having four cross-sectional planes C1–C4 depicted with dashed lines is defined in accordance with an area contacting the extended portion 84A of the front intermediate core 84, i.e., a magnetic flux inflow domain EC (referred to as EC domain), wherein all the magnetic fluxes passing through the magnetic head core 500 inevitably flows thereinto from the upper core 32 and flow out therefrom to the magnetic gap 80.

Assuming that a length Lb of the extended portion 84A of the front intermediate core 32 is less than a predetermined length, the SC domain will be saturated.

On the other hand, when the length Lb of the extended portion 84A is too long, the leakage flux between the extended portion 82A and 84A is increased. Further, when a length of the magnetic core from a rear to the magnetic gap 80 is too long, the recording and reproducing efficiency is degraded because of an increase of magnetic resistance.

Thus, the length Lb of the extended portion 84A is determined so that the magnetic saturation is prevented from occurring in the EC domain at a minimum length.

These relations are applicable to the lower core 16 and the extended portion 82A of the front intermediate core 82, thus the description is given by using the upper core 32 and the front intermediate core 84.

FIG. 11 is an enlarged perspective view for explaining a magnetic flux inflow domain EC, and FIG. 12 is an explanatory view for an operation of the magnetic flux inflow domain In order to obtain the most suitable value of the length Lb of the extended portion 84A, a description is given to operations of magnetic fluxes flowing into the EC domain of the upper core 32 referring to FIG. 11, wherein the EC domain is depicted, and FIG. 12, wherein a cross-sectional plane C4 of the EC domain shown in FIG. 11 is depicted.

As seen from FIG. 10, the magnetic flux passing trough the upper core 32 to the magnetic gap 80 inevitably flows into the EC domain.

At first, consideration is given to a magnetic flux flowing into a cross-sectional plane C1 located at a rear of the EC domain. The thickness of the extended portion 84A of the front intermediate core 84 located below the cross-sectional plane c1 is obtained as (tm–ts), wherein the "tm" is a thickness of the front intermediate core 84, and the "ts" is a ½ thickness of the spacer 65. A partial magnetic flux flowing into a cross-sectional area defined as [abcd] at the cross-sectional plane C1 of the EC domain is assumed to flow into the extended portion 84A through cross-sectional area defined as [adef] as shown with an arrow FA in FIG. 12.

Next, another partial flux flowing into a cross-sectional area defined as [bghc] of the C1 plane is assumed to pass through the EC domain and to flow into the front portion of the upper core 32 through a cross-sectional area defined as [ijkl] of a cross-sectional plane C3 as shown with an arrow FB in FIG. 12. A thickness of the cross-sectional area defined as [ijkl] is (tu–(tm–ts)), wherein the "tu" designates a thickness of the upper core 32.

Thus, another partial flux flowing out of a cross-sectional area defined as [ijmn] of a cross-sectional plane C3 has to be a sum of partial magnetic fluxes flowing into cross-sectional planes C2 and C4.

The partial magnetic fluxes from the cross-sectional planes CZ and C4 can flow into cross-sectional areas only defined as [mioh] and [njpg] as shown with an arrow FC in FIG. 12 because other partial magnetic flux flowing into the cross-sectional plane C1 is assumed to pass through the cross-sectional areas correspondingly with cross-sectional areas defined as [hoiledc] and [gpjkfab] of the C2 plane and the C4 plane as mentioned in the foregoing.

A maximum magnetic flux passing through the EC domain is the one which does not cause the EC domain to magnetically saturate, of which condition is that a cross-sectional area into which the magnetic flux flows are larger than a cross-sectional area from which the magnetic flux flow as long as the former is first one to be saturated.

Specifically, each of the cross-sectional areas of the cross-sectional planes C1, C2 defined as [njpg] and [mioh] is larger than a half of the cross-sectional area defined as [ijnm] of the cross-sectional plane C3.

The above relation can be obtained referring to FIG. 12. An area of a sector [ags] is calculated as $tu^2 \cdot \pi/4$, wherein "tu" designates the thickness of the upper core 32. An area defined as [gqrp] is calculated as $tu^2 - tu^2 \cdot \pi/4 tu^2 = 0.2 \cdot tu^2$, when an area defined as [rps] is neglected. The length of the segment nj is equal to (tm–ts). The length of the segment nq is equal to (Lb–tu).

Thus, the area S1 defined as [njpg] is obtained as follows:

$$S1=(Lb-tu)(tm-ts)+0.2tu^2 \quad (4)$$

The area defined as [ijnm] is obtained as Tr×(tm–ts).

Therefore, a condition that the EC domain is not saturated is that the area S1 is larger than a half of the area defined as [ijnm], thus the following relation is obtained:

$$Tr \cdot (tm-ts)/2 \leq S1 = (Lb-tu)(tm-ts)+0.2tu^2 \quad (5)$$

From the above condition, the length Lb of the extended portion 84A of the front intermediate core 84 is obtained as follows:

$$Lb > Tr/2 - 0.2tu^2/(tm-ts) + tu \quad (6)$$

Thus, the minimum length of Lb is obtained as follows:

$$Lb = Tr/2 - 0.2tu^2/(tm-ts) + tu \quad (7)$$

This length Lb shown by the formula (7) is the most suitable length of the extended portion 84A. In this embodiment, a specific value Lb is obtained as 10μ under a condition that Tr (track width) is 14 μm.

According to the fourth embodiment of the thin film magnetic head, the rear distal ends of the front intermediate cores 82, 84, i.e., the extended portions 82A, 84A of the front intermediate cores 82, 84, thus, the magnetic saturation is prevented nearby the inflection point P. Further, a thicker spacer 65 than that of the magnetic gap 80 is interposed between the extended portions 82A, 84A of the front intermediate cores 82, 84. thus, an excellent recording and reproducing efficiency can be obtained. Further, the most suitable lengths of the extended portions 82A, 84A is determined by the formula (7) so that the magnetic saturation nearby the inflection point P is prevented from occurring, which enables to provide a thin film magnetic head having a good recording and reproducing efficiency.

A fifth embodiment of a thin film magnetic head

Figure 13:
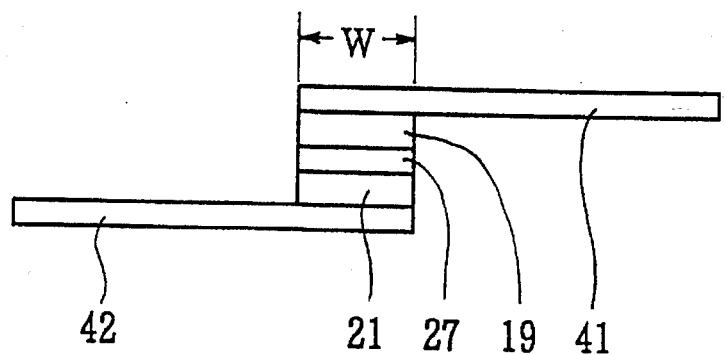
FIG. 13(A) is a front view showing a core portion of a fifth embodiment according to the present invention.
FIG. 13(B) is a plan view showing a core portion of the fifth embodiment according to the present invention.
Figure 13:
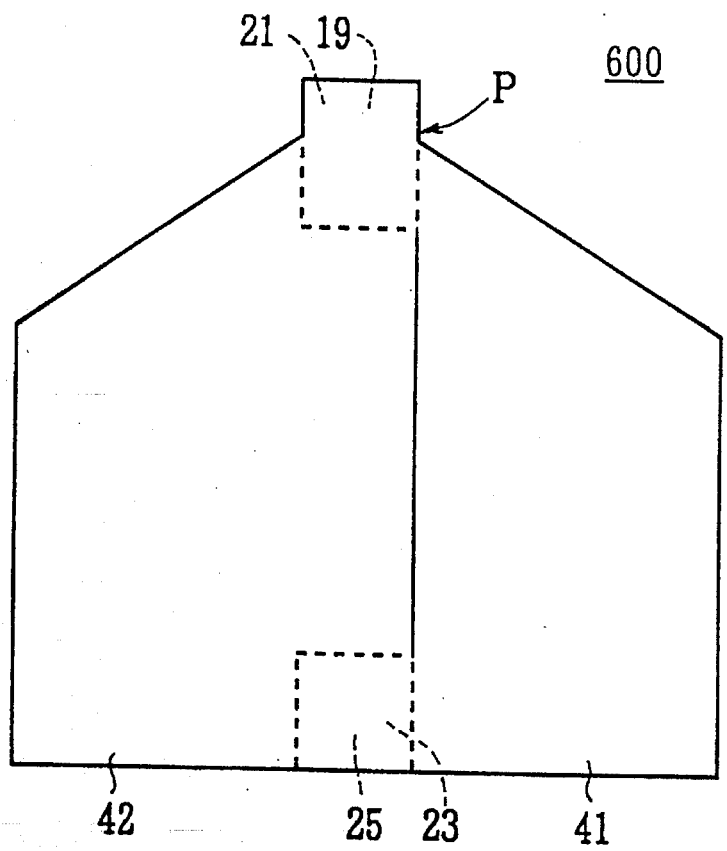

FIG. 13(A) is a front view showing a magnetic core portion of fifth embodiment according to the present invention, and FIG. 13(B) is a plan view showing a magnetic head core portion of a fifth embodiment according to the present invention.

As shown in FIG. 13(A) and FIG. 13(B), a magnetic head core 600 a fifth embodiment according to the present invention comprises a substrate (not shown), a lower core 41 provided on the substrate, the front intermediate cores 19, 21 substantially identical to the front intermediate cores 52, 54 of the first embodiment shown in FIGS. 4(B) and 5(A), which are provided respectively on the upper and lower cores 41, 42, and a magnetic gap 27 interposed between the front intermediate cores 19, 21 and the rear intermediate cores 23, 25. The insulator layers, coils and the substrate are not illustrated in the drawings because they are substantially identical to the aforementioned embodiments.

The configurations of the lower and upper cores 41, 42 are substantially identical to each other, i.e., each of them is made unsymmetrical to a center line of the magnetic head core 600 in a front view by causing one side thereof to be extended in a left-hand or a right hand direction and a superimposed portion facing each other is made a track width W of the thin film magnetic head.

However, the upper and lower cores 41, 42 are assembled so as not to be superimposed to each other except for the superposed portions which form the track width W.

Specifically, in this embodiment, the specified values of the components of the thin film magnetic head are as follows: the track width; 10 μm, a core length from the front and the rear; 130 μm, a length from the front to the inflection point P; 2 μm, each of the lengths of front intermediate cores 19, 21; 12 μm, each of the thicknesses of the lower and upper cores 42, 41; 2 μm, a distance between the lower and upper cores 42, 41; 5 μm, a relative permeability of the core; 500 or 10,000, and a gap length; 0.3 μm.

An analysis of a recording efficiency was conducted by using the above specified values, regarding the fifth embodiment of the thin film magnetic head having the abovementioned core shape.

As the analysis method, a finite-element method is employed for simulating a distribution of the magnetic field strength around the magnetic gap, wherein the magnetic field strength is obtained by causing the coils of 30 turns to flow a current of 30 mA.

For comparison, the results of the analysis are shown in Table 1 regarding the fifth embodiment together with the first embodiment of the present invention as a comparative example.

Figure 14:
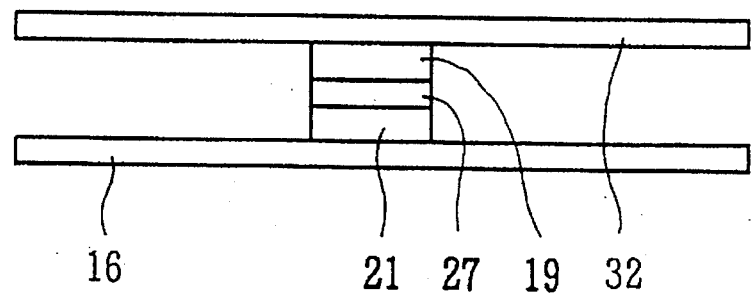
FIG. 14(A) is a front view showing the first embodiment of the present invention as a comparative example.
FIG. 14(B) is a plan view of the first embodiment of the present invention as a comparative example.
Figure 14:
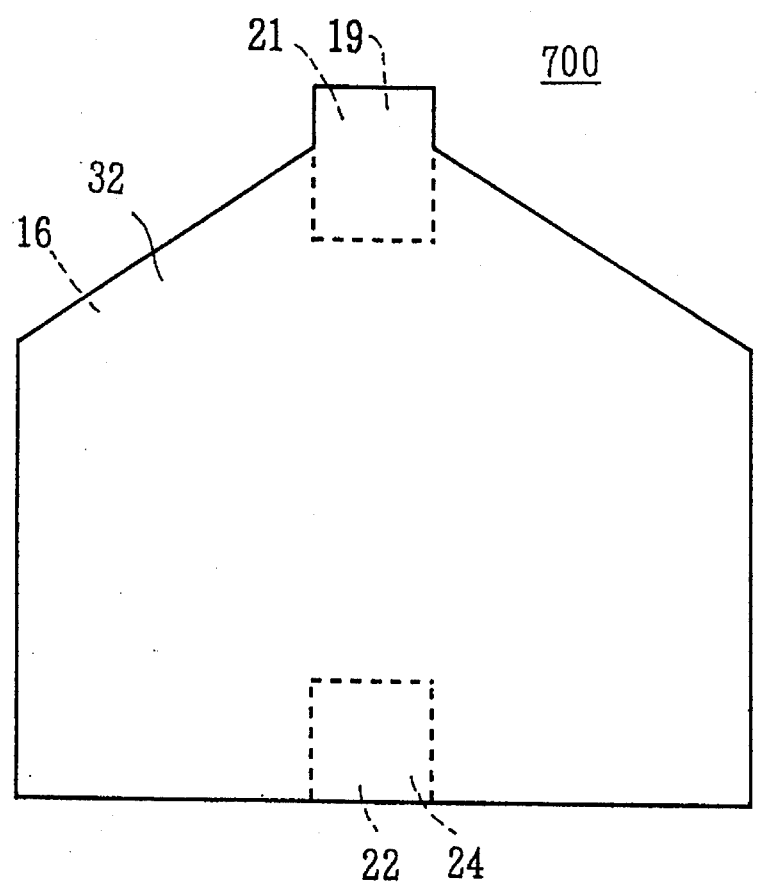

FIG. 14(A) is a front view showing the first embodiment of the present invention as a comparative example, and FIG. 14(B) is a plan view of the first embodiment of the present invention as a comparative example.

The specified values of the components of the first embodiment are identical to that of the fifth embodiment of the present invention except for the configuration of the lower and upper cores 16, 32, thus the same components as those of the fifth embodiment are designated with common reference characters.

As shown in FIGS. 14(A) and 14(B), the configurations of the upper and lower cores 32, 16 of the first embodiment are symmetrical at a center line of the magnetic head core 700 in a front view, thus, they face each other as mentioned in the foregoing.

TABLE 1

| embodiment | relative permeability 500 | relative permeability 10,000 |
| --- | --- | --- |
| fifth embodiment | * 8.99 × 10$^5$ | 2.99 × 10$^6$ |
| first embodiment | 5.48 × 10$^5$ | 2.63 × 10$^6$ |

(*The value shows a magnetic field strength in the magnetic gap. The unit is AT/m)

Figure 15:
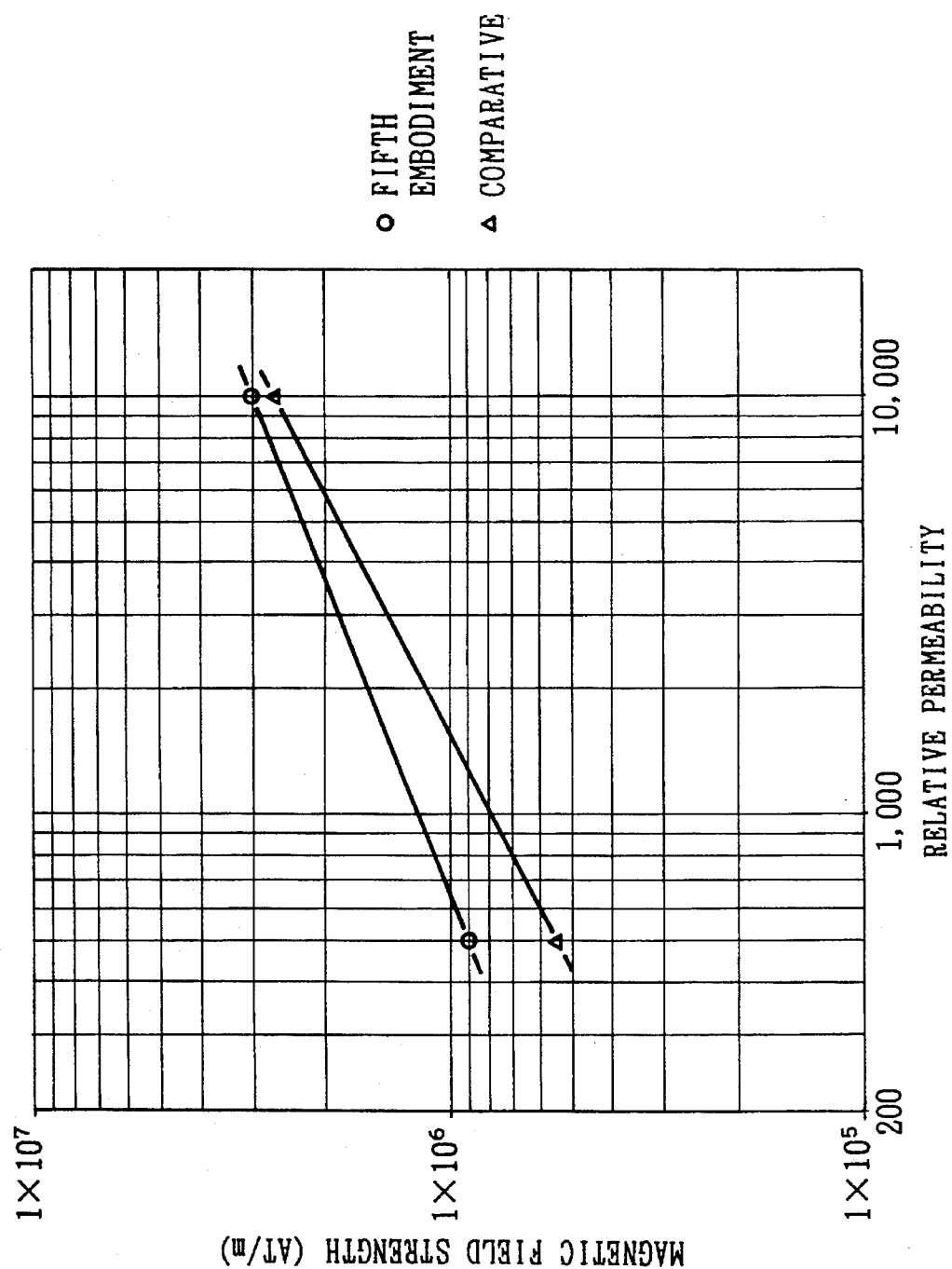
FIG. 15 is a graph showing the results shown in Table 1.

FIG. 15 is a graph showing the results shown in Table 1.

As seen from Table 1 and FIG. 15, according to the fifth embodiment of the present invention, a more intensive magnetic field strength is obtained at the magnetic gap 27 regardless of the relative permeability of the magnetic core, which shows that the thin film magnetic head of the fifth embodiment has a more excellent recording efficiency compared with the comparative of the first embodiment.

Table 2 shows qualitative differences of advantages based on differences of the shapes of the upper and the lower cores between the fifth embodiment and the first embodiment as a comparative.

TABLE 2

| embodiment | mag. resistance of core | leakage flux | magnetic field strength at gap |
| --- | --- | --- | --- |
| fifth embodiment | larger | smaller | larger |
| comparative | smaller | larger | smaller |

According to the fifth embodiment, since the cross-sectional area of the magnetic circuit is narrower than that of the comparative, the magnetic resistance is larger than that of the comparative of the first embodiment, however, as a result, the fifth embodiment shows more excellent recording efficiency compared with the comparative because of its less leakage flux.

A description is given to only two cases where the magnetic core has a relative permeability of 500 or 10,000, however, it may be said that in this embodiment, the smaller the relative permeability of the core becomes, the larger the leakage flux of the thin film magnetic head becomes, thus, the thin film magnetic head of the fifth embodiment shows much more excellent recording efficiency in the case of less than 500 of the relative permeability.

Further, it should be noted that the same is true as to the reproducing efficiency of the thin film magnetic head.

What is claimed is:

1. A thin film magnetic head comprising lower and upper cores, a pair of rear intermediate cores interposed between rear portions of the lower and upper cores, a pair of front intermediate cores interposed between front portions of the lower and upper cores and a magnetic gap provided between the pair of the front intermediate cores, the thin film magnetic head comprising:

the rear portions of the lower and upper cores having wider cross-sectional areas than those of the front portions of the lower and upper cores connected to the rear portions thereof forming inflection points;

the pair of the front intermediate cores having extended portions respectively, the extended portions being provided on the lower and upper cores so as to be long enough to prevent magnetic saturation in the magnetic circuit at the inflection points of the upper and lower cores by causing distal ends of the pair of front intermediate cores to be extended beyond the inflection points thereof; and a spacer of a non-magnetic material interposed between the extended portions, the spacer having a larger thickness than that of the magnetic gap so as to prevent magnetic leakage between the extended portions of the pair of the front intermediate cores.

2. A thin film magnetic head as claimed in claim 1, wherein a length Lb of one of the extended portions is approximately determined as follows:

$$Lb \geq Tr/2 - 0.2tu^2/(tm-ts) + tu$$

where Tr; a track width of the thin film magnetic head, tu; a thickness of one of the lower and upper cores, tm; a thickness of one of the front intermediate cores, and ts; a thickness of the spacer.

* * * * *